US012625267B2

(12) United States Patent
Ning et al.

(10) Patent No.: US 12,625,267 B2
(45) Date of Patent: May 12, 2026

(54) PLANE DETECTION METHOD AND DEVICE BASED ON LASER SENSOR

(71) Applicant: GOERTEK INC., Shandong (CN)

(72) Inventors: Yue Ning, Shandong (CN); Yifan Zhang, Shandong (CN); Libing Zou, Shandong (CN); Fuqiang Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 1166 days.

(21) Appl. No.: 17/309,923

(22) PCT Filed: Oct. 24, 2020

(86) PCT No.: PCT/CN2020/123466
§ 371 (c)(1),
(2) Date: Jun. 30, 2021

(87) PCT Pub. No.: WO2021/103875
PCT Pub. Date: Jun. 3, 2021

(65) Prior Publication Data
US 2022/0113420 A1      Apr. 14, 2022

(30) Foreign Application Priority Data
Nov. 25, 2019    (CN) .......................... 201911166056.3

(51) Int. Cl.
*G06N 20/20*          (2019.01)
*G01S 17/89*          (2020.01)

(52) U.S. Cl.
CPC .............. *G01S 17/89* (2013.01); *G06N 20/20* (2019.01)

(58) Field of Classification Search
CPC ........ G01S 17/89; G06N 20/20; G06N 20/00; G06F 18/214; G06F 18/243
See application file for complete search history.

(56) References Cited

U.S. PATENT DOCUMENTS 5,155,558 A * 10/1992 Tannenbaum ......... G01N 21/47
356/124.5
2003/0023341 A1* 1/2003 Sagawa .............. G05B 19/4093
700/86
(Continued)

FOREIGN PATENT DOCUMENTS

CN        104422406 A      3/2015
CN        104568749 A      4/2015
(Continued)

OTHER PUBLICATIONS

Zheng Fang, Li Ganhua, Cai Xuan-Ping, Statistical characteristics detection and error analysis of LMS, "Infrared and Laser Engineering" Dec. 31, 2006 (Dec. 31, 2006) No. 6 vol. 35 pp. 705-708, 758.
(Continued)

*Primary Examiner* — Phenuel S Salomon
(74) *Attorney, Agent, or Firm* — Ingrassia Fisher & Lorenz, LLP

(57) ABSTRACT

A plane detection method and device based on a laser sensor are disclosed. The method includes: acquiring data of the laser sensor after starting detection; inputting the data into a detection model trained in advance, wherein the detection model is obtained by training with data corresponding to a medium type selected in advance and is capable of recognizing the medium type selected; judging whether an object to which the data belongs is a plane, and if the object is a plane, determining the medium type of the plane; and setting corresponding optimization methods for different medium types, and optimizing the data according to the medium type. The laser sensor recognizes the medium type by the machine learning model, and optimizes the two-dimensional laser data according to the recognition results, and thus forms a more refined map and performs more accurate positioning based on the two-dimensional laser data.

7 Claims, 3 Drawing Sheets

(56)        References Cited

U.S. PATENT DOCUMENTS

| | | | | |
|---|---|---|---|---|
| 2014/0362385 A1* | 12/2014 | Uemura | ............... | G01B 11/245 |
| | | | | 356/601 |
| 2015/0066425 A1* | 3/2015 | Chang | .................. | G01B 11/306 |
| | | | | 702/150 |
| 2015/0228114 A1* | 8/2015 | Shapira | ................... | G06T 15/08 |
| | | | | 345/421 |
| 2017/0109874 A1* | 4/2017 | Hallasch | ................ | B23K 26/60 |
| 2018/0306924 A1 | 10/2018 | Olson et al. | | |
| 2019/0297182 A1 | 9/2019 | Camacho et al. | | |
| 2021/0099701 A1* | 4/2021 | Tourapis | ............... | H04N 19/60 |

FOREIGN PATENT DOCUMENTS

| | | | | | |
|---|---|---|---|---|---|
| CN | 105993034 | A | 10/2016 | | |
| CN | 107000118 | A | 8/2017 | | |
| CN | 107918940 | A | 4/2018 | | |
| CN | 109325941 | A | 2/2019 | | |
| CN | 109344804 | * | 2/2019 | .......... | G06F 18/214 |
| CN | 109344804 | A | 2/2019 | | |
| CN | 109447174 | A | 3/2019 | | |
| CN | 110021010 | A | 7/2019 | | |
| CN | 110458805 | A | 11/2019 | | |
| CN | 111027601 | A | 4/2020 | | |

OTHER PUBLICATIONS

Potena, Ciro, et al., Plane Extraction for Indoor Place Recognition, Department of Computer, Control and Management Engineering Sapienza University of Rome, Ariosto 25, 00185, Rome, Italy.
Rufei, Liu, A point cloud feature image generation method for pavement damage recognition, "Remote Sensing Information" Mar. 2019 (Aug. 31, 2019) Issue 4 vol. 34 Issue pp. 22-28.

* cited by examiner

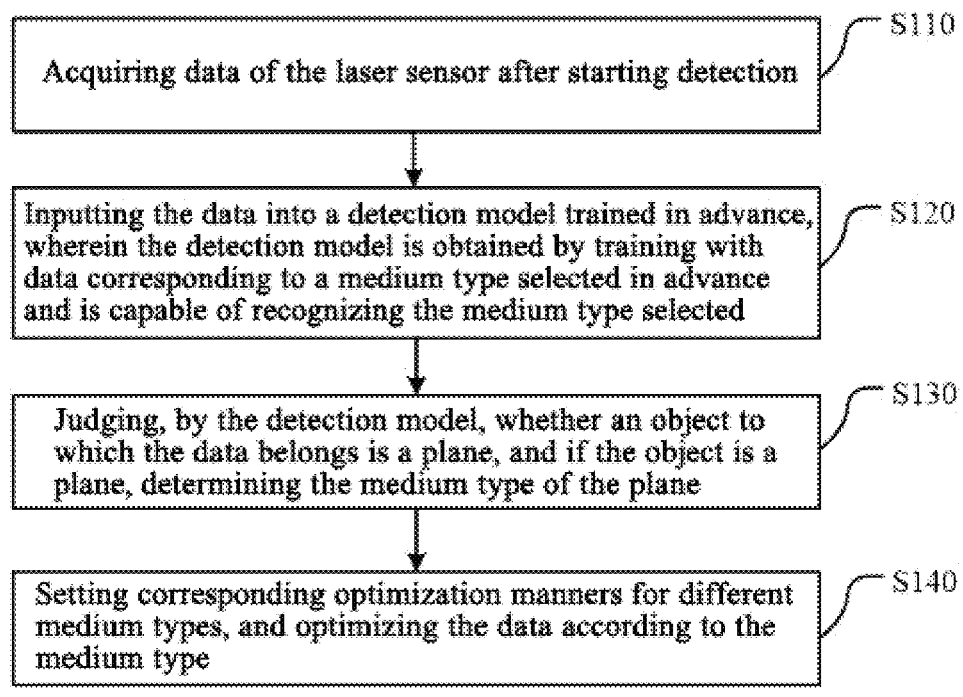

Acquiring data of the laser sensor after starting detection ⌐ S110

Inputting the data into a detection model trained in advance, wherein the detection model is obtained by training with data corresponding to a medium type selected in advance and is capable of recognizing the medium type selected ⌐ S120

Judging, by the detection model, whether an object to which the data belongs is a plane, and if the object is a plane, determining the medium type of the plane ⌐ S130

Setting corresponding optimization manners for different medium types, and optimizing the data according to the medium type ⌐ S140

Fig. 1

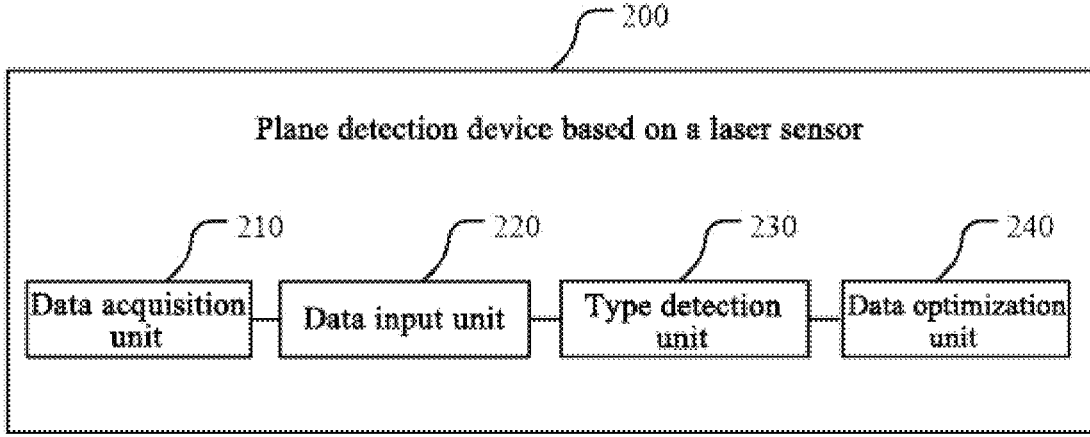

⌐ 200

Plane detection device based on a laser sensor

⌐ 210          ⌐ 220          ⌐ 230          ⌐ 240

Data acquisition unit — Data input unit — Type detection unit — Data optimization unit

PLANE DETECTION METHOD AND DEVICE BASED ON LASER SENSOR

CROSS-REFERENCE TO RELATED APPLICATION

This Application is a U.S. National-Stage entry under 35 U.S.C. § 371 based on International Application No. PCT/CN2020/123466, filed Oct. 24, 2020 which was published under PCT Article 21(2) and which claims priority to Chinese Application No. 201911166056.3, filed Nov. 25, 2019, which are all hereby incorporated herein in their entirety by reference.

TECHNICAL FIELD

This Application pertains to the field of machine learning, and in particular to a plane detection method and device based on a laser sensor, an electronic apparatus and a readable storage medium.

BACKGROUND

With the thriving of robots and autonomous driving, issues such as simultaneous localization and mapping (SLAM) of robots have attracted more and more attention. The laser sensor is currently the main sensor that can be used to solve the problem. Compared with ordinary rangefinders, they have the merits of fast speed, long distance, and relatively high accuracy. When positioning with laser, the accuracy and frequency of laser output have significant impact on the positioning accuracy, but the performance of laser is not so satisfactory when dealing with special materials and special-shaped surfaces.

The single line laser sensor generates laser data frame by frame through the continuous transmission and reception of a laser transmitter and a receiver. Ideally, by calculating the time difference between transmitting and receiving laser, the distance of the obstacle in the angle can be obtained; however, some lasers will not be received by the receiver due to angle problems, and the distance measured by some will fluctuate due to the diffuse reflection of light. In actual use, the reflection of walls made of different media is not the same, so even if the wall is originally flat, it may be an uneven surface in the laser data. This problem will cause the map generated by the laser SLAM not to match with the actual map. In addition, other objects, desirable features and characteristics will become apparent from the subsequent summary and detailed description, and the appended claims, taken in conjunction with the accompanying drawings and this background.

SUMMARY

In view of the above problems, the present disclosure is proposed to provide a plane detection method and device based on a laser sensor, an electronic apparatus and a readable storage medium that can overcome or at least partially solve the above problems.

According to an aspect of the present disclosure, a plane detection method based on a laser sensor is provided. The method comprises:

acquiring data of the laser sensor after starting detection;
inputting the data into a detection model trained in advance, wherein the detection model is obtained by training with data corresponding to a medium type selected in advance and is capable of recognizing the medium type selected;

judging, by the detection model, whether an object to which the data belongs is a plane, and if the object is a plane, determining the medium type of the plane; and setting corresponding optimization manners for different medium types, and optimizing the data according to the medium type.

According to another aspect of the present disclosure, a plane detection device based on a laser sensor is provided. The device comprises:

a data acquisition unit for acquiring data of the laser sensor after starting detection;

a data input unit for inputting the data into a detection model trained in advance, wherein the detection model is obtained by training with data corresponding to a medium type selected in advance and is capable of recognizing the medium type selected;

a type detection unit for judging whether an object to which the data belongs is a plane by the detection model, and if the object is a plane, determining the medium type of the plane; and a data optimization unit for setting corresponding optimization manners for different medium types, and optimizing the data according to the medium type.

According to yet another aspect of the present disclosure, an electronic apparatus is provided. The electronic apparatus comprises: a processor and a memory arranged to store computer executable instructions, wherein the executable instructions, when executed, cause the processor to perform the above method.

According to still yet another aspect of the present disclosure, a computer readable storage medium is provided, wherein the computer readable storage medium stores one or more programs, and the one or more programs, when executed by a processor, implement the above method.

It can be seen from the above that the technical solutions of the embodiments of the present disclosure recognize the medium type to which the two-dimensional laser data of a wall and other planes belongs by a machine learning model, and optimizes the two-dimensional laser data according to the recognition result, and thus form a more refined map and perform more accurate positioning based on the two-dimensional laser data.

The above description is only an overview of the technical solutions of the present disclosure. In order to more clearly understand the technical means of the present disclosure to implement the present disclosure according to the contents of the specification, and in order to make the above and other objectives, features and advantages of the present disclosure more obvious and understandable, specific embodiments of the present disclosure will be illustrated hereinafter.

BRIEF DESCRIPTION OF DRAWINGS

The present invention will hereinafter be described in conjunction with the following drawing figures, wherein like numerals denote like elements, and:

FIG. 1 is a schematic flow chart of a plane detection method based on a laser sensor according to an embodiment of the present disclosure;

FIG. 2 is a schematic diagram of the structure of a plane detection device based on a laser sensor according to an embodiment of the present disclosure;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Hereinafter, exemplary embodiments of the present disclosure will be described in more detail with reference to the drawings. Although the drawings show the exemplary embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

FIG. 1 is a schematic flowchart of a plane detection method based on a laser sensor according to an embodiment of the present disclosure. The method includes:

S110, acquiring data of the laser sensor after starting detection;

Taking a 360° two-dimensional laser sensor as an example, the data acquired is two-dimensional data on a plane at a certain height from the ground. Each frame of data contains 360 data, each of which corresponds to the distance measured in each degree.

Figure 5:
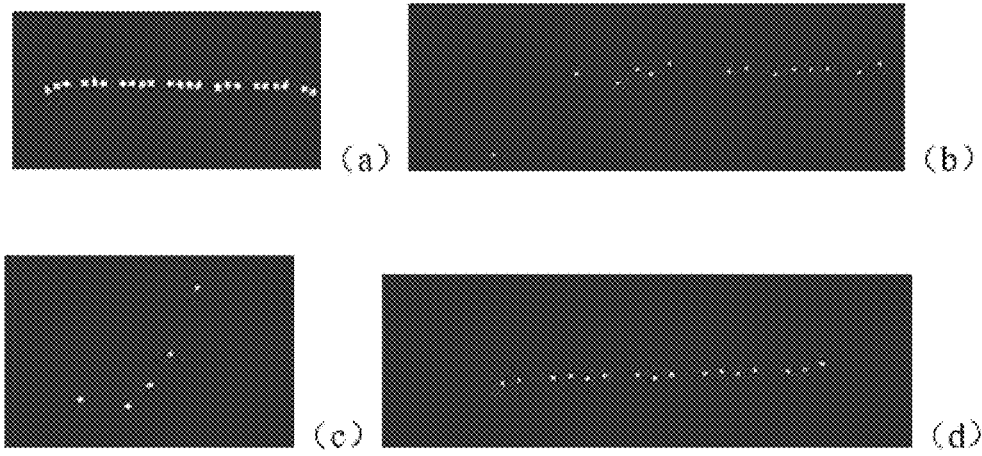
FIG. 5 is a schematic diagram of a graphical structure of laser point data of different medium types according to an embodiment of the present disclosure.

If the object detected is a vertical wall, the two-dimensional data obtained in an ideal state should be roughly linear in two-dimensional coordinates, as shown in FIG. 5(*a*), which is laser reflection point data generated by a conventional medium. If a regular uneven surface is detected, the image in the two-dimensional coordinates should be multiple regular line segments. However, if the wall medium is a black medium, some reflection points are absorbed, resulting in a deficient image as shown in 5(*b*). If it is faced with a mirror-like medium such as highly reflective glass, the positions of the returned laser reflection points are likely to change, and the distribution of laser points satisfies a predetermined tortuosity curve, as shown in FIG. 5(*c*). If the material is a conventional non-black metal medium, the reflection points also tend to form a regular shape, see FIG. 5(*d*).

Preferably, after the data is acquired, the data may be judged in advance to obtain the area that needs to pay attention to, and intercept the part that may have a plane such as a wall.

Step S120, inputting the data into a detection model trained in advance, wherein the detection model is obtained by training with data corresponding to a medium type selected in advance and is capable of recognizing the medium type selected.

If the medium types of different walls are different, the laser point data distribution obtained is also different. Therefore, in the present embodiment, the medium type is judged according to the characteristics of laser point data distribution. When the detection model is trained, the correlation information is set in advance by, for example, adding labels, so as to realize the classification and recognition of the medium type to which the data belongs.

Step S130, judging, by the detection model, whether an object to which the data belongs is a plane, and if the object is a plane, determining the medium type of the plane.

The data is input to a detection model trained in advance to judge whether the object to which the data belongs is a plane, and if the object is a plane, the medium type of the plane is determined.

For the data input to the detection model trained in advance, it may be further judged whether the source of the reflection points of the data is a plane such as a wall, if it is a plane, the data of this part is stored, and the medium type of the plane is further judged.

Step S140, setting corresponding optimization manners for different medium types, and optimizing the data according to the medium type. In this step, according to the medium material of the plane to which this part of data belongs and the characteristics of reflection points of each medium, the optimization processing, such as median filtering, interpolation or nearest neighbor resampling, is perform on this part of data, so as to reflect the plane more accurately and provide better data for further SLAM.

In sum, according to the above solution of the present embodiment, the classification and detection of various wall plane materials according to the two-dimensional laser data are realized, and the data is optimized respectively according to the characteristics of the medium material.

In an embodiment, the medium type includes any one of the following: a mirror-like medium, a non-black metal medium, a black medium, and other conventional media.

The inventors analyzed the wall media and found that, in the case of the following three types of media: mirror-like medium, pure black medium, and metal medium, the error between the map generated according to the laser data and the actual map in the conventional solutions is relatively large. It has become a current difficulty how to estimate the corresponding medium by analyzing the actual performance of laser and further perform correction on the laser data. In this preferred embodiment, according to experiments such as training and testing and the characteristics of the reflection points of each medium, the wall media are classified into the following categories: a mirror-like medium, a non-black metal medium, a black medium, and other conventional media. Other conventional media mainly include ordinary wall media other than the following three types: a mirror-like medium, a non-black metal medium, and a black medium. By adding conventional media for training, this solution can be compatible with conventional detection methods while it can deal with special media at the same time. This solution is not strictly limited to the above three special media, and other types of special media can be selected.

In an embodiment, the detection model trained in advance is obtained by training in the following steps:

first, using the laser sensor to collect data in complex scenes;

second, performing data preprocessing, grouping and labeling the data, and forming sample sets by groups of data, wherein a label added includes at least the following information: whether an object to which a
sample belongs is a plane, and a medium type of a
plane;
In the preprocessing, in order to obtain samples of mod-
erate cost (such as length and calculation amount), the
data collected can be grouped first, and according to the
purpose of detection, each group of data also needs to
be labeled. The information labeled includes whether
the sample represents a plane, what kind of medium is
the plane, etc. In actual training, it is necessary to
separate each group of data from the label.
A sample set is formed by each group of data, and the
sample sets can be further divided into a training set and a
testing set. Preferably, the sample sets can be divided into a
training set and a testing set according to a ratio of 7:3.

Then, selecting an appropriate algorithm to construct a
detection model, and using the data sets to train and/or test
the detection model.

In an embodiment, grouping the data includes: grouping
the data according to a preset number of points, and taking
each data of the preset number of points as a sample; taking
a first point in each sample as a coordinate origin, calculat-
ing local coordinate values of remaining points in the
sample, and storing the local coordinate values in an array;
determining a farthest distance between points in a group
according to the array, and if the farthest distance exceeds a
first threshold, discarding the group of data, otherwise
selecting the group of data to form a sample set.

In order to improve the reliability and validity of the data,
according to the characteristics of the wall, the data of plane
should be a series of points having a certain density. There-
fore, the distance between the points can be calculated
according to the coordinates in each group of data, and only
when each distance of points is less than a preset threshold,
the group of data is used as a training or testing sample.

In an embodiment, calculating local coordinate values of
remaining points in the sample, and storing the local coor-
dinate values in an array further comprises: calculating a
mean value and a variance of all abscissa values and ordinate
values in the sample, taking the mean value and the variance
as data features, and storing them in an array.

In order to enrich the data features of each sample, in the
present embodiment, the mean value and variance of the
coordinate values of all the data points in the sample are
added to the array to facilitate subsequent recognition and
judgment of the medium type to which it belongs based on
the data features, and further improve the accuracy of the
test results.

In an embodiment, constructing a detection model com-
prises: constructing a detection model based on an xgboost
algorithm, and using the xgboost algorithm to generate a
decision tree for detecting the medium type according to the
sample sets.

Due to the large number of training sets, and considering
the speed, size and robustness of the model, xgboost is a
better choice. The xgboost (eXtreme Gradient Boosting)
algorithm is an efficient implementation of the GB algo-
rithm. The base learner in xgboost can be either CART or a
linear classifier (gblinear). The specific principle of this
technology will not be described here in detail. In the present
embodiment, the greedy algorithm can be used to split the
corresponding features, and then the second optimization is
used to determine the node and calculate the minimum value
of the loss function, and finally the decision tree is deter-
mined through multiple enumerations.

Figure 6:
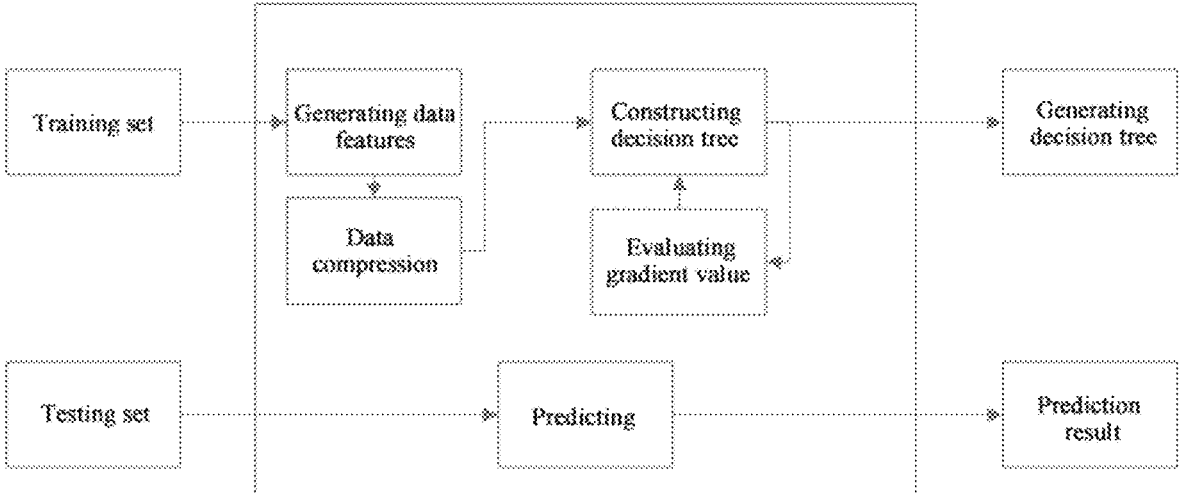
FIG. 6 is a schematic diagram of the structure of a training and testing model according to an embodiment of the present disclosure.

Referring to FIG. 6, after the sample set enters the
detection model, data features are generated first, then the data is compressed, a decision tree is constructed, and then
a decision tree is generated, thereby classifying the medium
type to which the sample belongs. It also comprises the
evaluation and optimization of the decision tree using the
method of evaluating the gradient value.

After the training set is completed, the detection model is
tested to verify the training results and determine whether
the trained model is usable.

In an embodiment, training the detection model using the
sample sets further comprises:
dividing the sample sets into a training set and a testing
set, dividing the training set into multiple groups,
training a first group of training set, and then using the
testing set to test;
if accuracy of a test result is lower than a second thresh-
old, analyzing a label and laser point data of each
sample in the group of training sets, and judging
whether a data feature of the laser point data is con-
sistent with the medium type in the label;
if it is consistent, keeping the sample, otherwise elimi-
nating the sample until the group of training set satisfy
an accuracy requirement;
adding one or more subsequent groups of training set and
merging, then continuing training.
When using the model after trained to predict the training
set, the second threshold can be set to 90%. For example, if
the accuracy of result is less than 90%, analyze the training
set and the testing set, analyze the distribution of laser
points, find out and eliminate samples that may have a
negative effect on the prediction result. For example, if it is
labeled as a normal wall but the actual distribution of laser
is tortuous, since generally the laser can reflect the outline of
the object, and for a normal wall the laser points should be
uniformly distributed on a line, the reason that the data is
wavy or irregular may be the wall surface is uneven, and the
data belongs to interference data.

The manner of eliminating interference points is as fol-
lows. The training set is divided into multiple groups. Since
there is a large batch of labeled data in data preprocessing,
it is not easy to pay attention to and analyze each group of
data. During the training, the areas that need to pay attention
to can be known, and these areas can be taken as key areas
to perform screening and interference elimination. Each
training set is input to the model and trained using the
xgboost algorithm, and then is tested using the testing set. If
the accuracy of result is less than 90%, the group of data is
analyzed to check the distribution of labels and laser points.
The distribution of laser points of the three special materials
(the mirror-like medium, pure black material surface, and
metal surface) is not linear. The mirror-like medium and
metal surface satisfy a predetermined tortuosity curve. The
data points corresponding to the pure black material surface
tolerate the corresponding sparseness (because they will be
absorbed). The data distribution of ordinary walls is gener-
ally neat and even distribution on a straight line. To judge
whether a data feature of the group of data is consistent with
the data feature that its corresponding label should comply
with, specifically, with respect to data of ordinary walls,
confirm whether the data is neatly and evenly distributed on
a straight line; with respect to data of a black medium wall,
analyze whether the data is sparse; with respect to data of a
mirror-like medium and a metal medium, analyze whether
their tortuosity and distribution conform to their predeter-
mined laws. If not, judge that the group of data is a negative
interference sample and eliminate it. Then, if the accuracy of
the first group of data is required to be 90%, this group satisfies the standard, and then one or more subsequent groups of data are added and merged, and then training is performed.

In an embodiment, adding one or more subsequent groups of training set and merging, then continuing training comprises: if accuracy of a test result currently obtained is lower than the second threshold, keeping the group of training set whose test result has an accuracy higher than the second threshold, only analyzing data of one or more groups of training set added subsequently, and eliminating inconsistent samples in the groups of training set added subsequently.

In the subsequent training, if the accuracy does not satisfy the requirement, only the newly added groups of training set need to be screened. In other words, the merged groups of training set are tested, if the accuracy of a test result currently obtained is lower than the second threshold, the training set whose test result has an accuracy higher than the second threshold is kept; that is, the training set that has reached the training requirement in the previous period is kept, and only the data of one or more groups of training set added subsequently is analyzed; that is, the screening focuses on the newly added data, and the corresponding samples are eliminated.

In sum, by removing the samples that interfere much with the prediction or that are ambiguous, performing training again, and correcting the data, the accuracy of testing is improved. In addition, by grouping the large batch of labeled data, the present embodiment solves the problems in manual analysis of laser data, such as difficulty in extracting features, large amount of calculation, and not knowing which area to optimize.

In an embodiment, optimizing the data according to the medium type comprises any one or more of the following:

if the medium type is a mirror-like medium or a non-black metal medium, performing median filtering on the corresponding data, so that the data tends to be flat;

if the medium type is a black medium, inserting missing data points in the corresponding data according to an arithmetic sequence;

if the medium type is other conventional media, increasing data point density in the corresponding data using a nearest neighbor resampling method.

The specific optimization method is as follows:

1. The reflection of the laser on the mirror-like surface is zigzag although the mirror surface is actually flat, so if the detection result indicates that the wall medium is a mirror-like medium, in the optimization process, median filtering is performed on this part of the data to make all the data tend to be flat. The judgment result of the metal medium is processed in the same way.

2. If the detection result indicates that the wall medium is a flat wall (ordinary media other than the mirror-like medium, pure black material surface and metal surface), the nearest neighbor resampling method can be used to properly increase the point density to improve the laser performance.

3. If the detection result indicates that the wall medium is a pure black material surface, and if according to the laser reflection intensity and the output result of the model, a black surface that easily absorbs the laser is detected, some laser points will be lost, and then the missing laser points can be inserted according to the arithmetic sequence method. The predetermined number of points inserted are taken as the points collected by the laser. Among them, the nearest neighbor method directly uses the data of the data point closest to a certain data point as the new value of this data point.

This method has merits of being simple, fast processing speed, and not changing the original data value. This process is repeated, and the optimized laser data is used for positioning or mapping.

FIG. 2 is a schematic diagram of the structure of a plane detection device based on a laser sensor according to an embodiment of the present disclosure. The device 200 comprises:

a data acquisition unit 210 for acquiring data of the laser sensor after starting detection;

Taking a 360° two-dimensional laser sensor as an example, the data acquired is two-dimensional data on a plane at a certain height from the ground. Each frame of data contains 360 data, each of which corresponds to the distance measured in each degree.

Preferably, after the data is acquired, the data may be judged in advance to obtain the area that needs to pay attention to, and intercept the part that may have a plane such as a wall.

a data input unit 220 for inputting the data into a detection model trained in advance, wherein the detection model is obtained by training with data corresponding to a medium type selected in advance and is capable of recognizing the medium type selected;

If the medium type of wall is different, the laser point data distribution obtained is also different. Therefore, in the present embodiment, the medium type is judged according to the characteristics of laser point data distribution. When the detection model is trained, the correlation information is set in advance by, for example, adding labels, so as to realize the classification and recognition of the medium type to which the data belongs.

a type detection unit 230 for judging whether an object to which the data belongs is a plane by the detection model, and if the object is a plane, determining the medium type of the plane;

The data is input to a detection model trained in advance to judge whether the object to which the data belongs is a plane, and if the object is a plane, the medium type of the plane is determined.

For the data input to the detection model trained in advance, it may be further judged whether the source of the reflection points of the data is a plane such as a wall, if it is a plane, the data of this part is stored, and the medium type of the plane is further judged.

a data optimization unit 240 for setting corresponding optimization manners for different medium types, and optimizing the data according to the medium type.

According to the medium material of the plane to which this part of data belongs and the characteristics of reflection points of each medium, the optimization processing, such as median filtering, interpolation or nearest neighbor resampling, is perform on this part of data, so as to reflect the plane more accurately and provide better data for further SLAM.

In sum, according to the detection device of the present embodiment, the classification and detection of various wall plane materials according to the two-dimensional laser data are realized, and the data is further optimized respectively according to the characteristics of the medium material, which solves the problems in manual analysis of laser data, such as difficulty in extracting features, large amount of calculation, and not knowing which area to optimize.

In an embodiment, the medium type includes any one of the following: a mirror-like medium, a non-black metal medium, a black medium, and other conventional media.

In an embodiment, the device 200 further comprises a detection model training unit for obtaining the detection model trained in advance by training by the following steps:

first, using the laser sensor to collect data in complex scenes;

second, performing data preprocessing, grouping and labeling the data, and forming sample sets by groups of data, wherein a label added includes at least the following information: whether an object to which a sample belongs is a plane, and a medium type of a plane;

then, selecting an appropriate algorithm to construct a detection model, and using the data sets to train the detection model.

In an embodiment, the detection model training unit is for: grouping the data according to a preset number of points, and taking each data of the preset number of points as a sample; taking a first point in each sample as a coordinate origin, calculating local coordinate values of remaining points in the sample, and storing the local coordinate values in an array; determining a farthest distance between points in the sample according to the array, and if the farthest distance exceeds a first threshold, discarding the group of data, otherwise selecting the group of data to form a sample set.

In an embodiment, the detection model training unit is for calculating a mean value and a variance of all abscissa values and ordinate values in the sample, taking the mean value and the variance as data features, and storing them in the array.

In an embodiment, the detection model training unit is for constructing a detection model in the following way: constructing a detection model based on an xgboost algorithm, and using the xgboost algorithm to generate a decision tree for detecting the medium type according to the sample sets.

In an embodiment, the detection model training unit is for dividing the sample sets into a training set and a testing set, dividing the training set into multiple groups, training one group of training set, and then using the testing set to test;

if accuracy of a test result is lower than a second threshold, analyzing a label and laser point data of each sample in the group of training set, and judging whether a data feature of the laser point data is consistent with the medium type in the label;

if it is consistent, keeping the sample, otherwise eliminating the sample until the group of training set satisfy an accuracy requirement;

adding one or more subsequent groups of training set and merging, then continuing training.

In an embodiment, the detection model training unit is for, if accuracy of a test result currently obtained is lower than the second threshold, keeping a group of training set whose test result has an accuracy higher than the second threshold, only analyzing data of one or more groups of training sets added subsequently, and eliminating inconsistent samples in the groups of training sets added subsequently.

In an embodiment, the data optimization unit 240 is for:

if the medium type is a mirror-like medium or a non-black metal medium, performing median filtering on the corresponding data, so that the corresponding data tends to be flat;

if the medium type is a black medium, inserting missing data points in the corresponding data according to an arithmetic sequence;

if the medium type is other conventional media, increasing data point density in the corresponding data using a nearest neighbor resampling method.

In sum, the technical solution of the present disclosure discloses plane detection technical solutions based on a laser sensor, which recognize the medium type to which the two-dimensional laser data of a wall and other planes belongs by a machine learning model, and further optimizes the two-dimensional laser data according to the recognition result, and thus form a more refined map and perform more accurate positioning based on the two-dimensional laser data.

It should be noted:

The algorithms and demonstrations given here are not intrinsically associated with any particular computer, virtual system, or other device. All general-purpose system can be used in conjunction with demonstrations here. Based on the above descriptions, architectures for constructing such a system are apparent. In addition, the present disclosure is not dependent on any particular programming language. It is understandable that various programming languages can be used to realize contents of the present disclosure described herein, and that the above descriptions concerning specific languages are intended to reveal the best implementation of the present disclosure.

In the description provided herein, numerous specific details are set forth. However, it can be understood that embodiments of the present disclosure may be practiced without these specific details. In other examples, well-known methods, structures and techniques have not been shown in detail in order not to obscure an understanding of this description.

Similarly, it should be appreciated that in order to simplify the present disclosure and help understand one or more of the various inventive aspects, in the above description of exemplary embodiments of the present disclosure, various features of the present disclosure are sometimes grouped together in a single embodiment, diagram, or description thereof. However, the method disclosed should not be interpreted as reflecting an intention that the claimed present disclosure requires more features than those expressly recited in each claim. More exactly, as the following claims reflect, inventive aspects include features less than all features of a single foregoing disclosed embodiment. Thus, the claims following the detailed description are hereby expressly incorporated into this detailed description, with each claim being an independent embodiment of the present disclosure.

Those skilled in the art can understand that it is possible to adaptively change the modules in the device in the embodiments and set them in one or more devices different from the embodiments. The modules or units or components in the embodiments can be combined into one module or unit or component, and in addition, they can be divided into multiple sub-modules or sub-units or sub-components. Except that at least some of such features and/or processes or units are mutually exclusive, any combination can be used to combine all features disclosed in this specification (including the accompanying claims, abstract and drawings) and all processes or units of any method or device disclosed in such a way. Unless expressly stated otherwise, each feature disclosed in this specification (including the accompanying claims, abstract and drawings) may be replaced by an alternative feature providing the same, equivalent or similar purpose.

In addition, although some embodiments described herein include some but not other features included in other embodiments, combinations of features of different embodiments are meant to be within the scope of the present disclosure, and form different embodiments, as would be understood by those in the art. For example, in the following claims, any of the claimed embodiments can be used in any combination.

The various component embodiments of the present disclosure may be implemented by hardware, or by software modules running on one or more processors, or by their combination. Those skilled in the art should understand that a microprocessor or a digital signal processor (DSP) can be used in practice to implement some or all functions of some or all the components of the plane detection device based on a laser sensor according to the embodiments of the present disclosure. The present disclosure can also be implemented as a device or device program (for example, a computer program and a computer program product) for executing part or all of the methods described herein. Such a program for realizing the present disclosure may be stored on a computer readable medium, or may have the form of one or more signals. Such signals can be downloaded from Internet websites, or provided on carrier signals, or provided in any other form.

Figure 3:
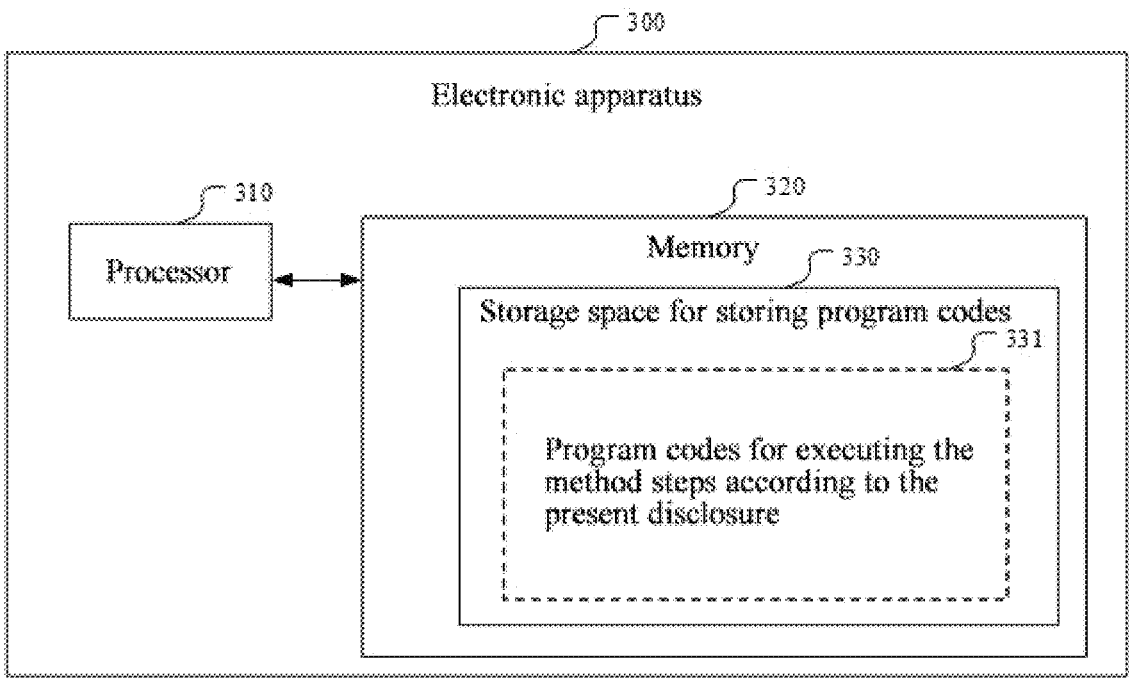
FIG. 3 is a schematic diagram of the structure of an electronic apparatus according to an embodiment of the present disclosure.

For example, FIG. 3 is a schematic diagram of the structure of an electronic apparatus according to an embodiment of the present disclosure. The electronic apparatus 300 includes a processor 310 and a memory 320 arranged to store computer-executable instructions (computer readable program codes). The memory 320 may be an electronic memory such as flash memory, EEPROM (electrically erasable programmable read only memory), EPROM, hard disk, or ROM. The memory 320 has a storage space 330 for storing computer readable program codes 331 for executing any method steps in the above methods. For example, the storage space 330 for storing computer readable program codes may include various computer readable program codes 331 respectively used to implement various steps in the above method.

Specifically, the executable instructions in the memory 320, when executed, cause the processor 310 to obtain the detection model by training through the following processing:

collecting laser point data corresponding to a medium type selected in advance by using the laser sensor;

grouping and labeling the laser point data, and forming sample sets by each grouped data, wherein a label added includes at least the following information: whether the object to which a sample belongs is a plane, and the medium type of the plane; and constructing a detection model, and training the detection model using the sample sets.

Further, the executable instructions in the memory 320, when executed, further cause the processor to group the laser point data through the following processing:

grouping the laser point data according to a preset number of points, and taking each data of the preset number of data as a sample;

taking a first point in each sample as a coordinate origin, calculating local coordinate values of remaining points in the sample, and storing the local coordinate values in an array; and determining a farthest distance between points in the sample according to the array, and if the farthest distance exceeds the first threshold, discarding the sample, otherwise selecting the sample to form a sample set.

Further, the executable instructions in the memory 320, when executed, further cause the processor to train the detection model using the sample sets through the following processing:

dividing the sample sets into a training set and a testing set, dividing the training set into multiple groups, training one group of the training set, and then using the testing set to test;

if accuracy of a test result is lower than a second threshold, analyzing the label and laser point data of each sample in the group of training set, and judging whether the data feature of the laser point data is consistent with the medium type in the label;

if it is consistent, keeping the sample, otherwise eliminating the sample until the training set satisfies an accuracy requirement;

adding one or more subsequent groups of training sets, and continuing training after merging.

Figure 4:
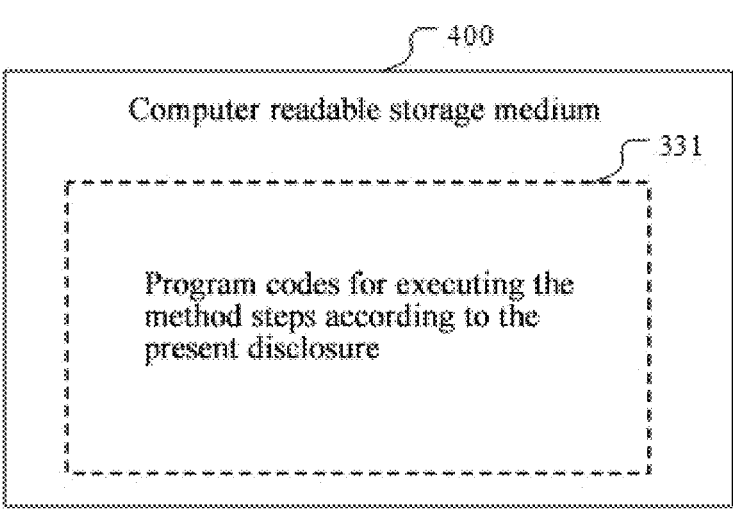
FIG. 4 is a schematic diagram of the structure of a computer readable storage medium according to an embodiment of the present disclosure.

The computer readable program code 331 may be read from or written into one or more computer program products. These computer program products include program code carriers such as hard disks, compact disks (CDs), memory cards or floppy disks. Such a computer program product is typically a computer readable storage medium as shown in, for example, FIG. 4. FIG. 4 is a schematic diagram of the structure of a computer readable storage medium according to an embodiment of the present disclosure. The computer readable storage medium 400 stores the computer readable program code 331 for executing the method steps according to the present disclosure, which can be read by the processor 310 of the electronic apparatus 300. When the computer readable program code 331 is run by the electronic apparatus 300, the electronic apparatus 300 is caused to execute each step in the methods described above. Specifically, the computer readable program code 331 stored in the computer readable storage medium can execute the methods shown in any of the above embodiments. The computer readable program code 331 may be compressed in an appropriate form.

It should be noted that the above embodiments illustrate rather than limit the present disclosure, and those skilled in the art can design alternative embodiments without departing from the scope of the appended claims. In the claims, any reference signs placed between parentheses should not be constructed as a limitation to the claims. The word "comprising" does not exclude the presence of elements or steps not listed in the claims. The word "a" or "an" preceding an element does not exclude the presence of multiple such elements. The present disclosure can be implemented by means of hardware comprising several different elements and by means of a suitably programmed computer. In the unit claims enumerating several devices, several of these devices may be embodied in the same hardware item. The use of the words "first", "second" and "third" does not indicate any order. These words can be interpreted as names.

What is claimed is:

1. A robot, comprising: a processor; a laser sensor; and a memory arranged to store computer executable instructions, wherein the processor performs the following processing:

acquiring data by the laser sensor after starting detection;

inputting the data into a detection model trained in advance, wherein the detection model is obtained by training with data corresponding to a medium type selected in advance for recognizing the medium type selected;

judging, by the detection model, whether an object to which the data belongs is a plane, and if the object is a plane, determining the medium type of the plane, otherwise eliminating the object; and setting corresponding optimization manners for different medium types, optimizing the data according to the medium type, and performing positioning or mapping of robots using the optimized data, wherein the medium type includes any one of the following: a mirror-like medium, a non-black metal medium, a black medium, and other conventional media, optimizing the data according to the medium type comprises:

if the medium type is a mirror-like medium or a non-black metal medium, performing median filtering on corresponding data, so that the corresponding data tends to be flat;

if the medium type is a black medium, inserting missing data points in corresponding data according to an arithmetic sequence;

if the medium type is other conventional media, increasing data point density in corresponding data using a nearest neighbor resampling method, wherein the processor obtains the detection model by training through the following processing:

using the laser sensor to collect laser point data corresponding to a medium type selected in advance;

grouping and labeling the laser point data, and forming sample sets by groups of data, wherein a label added includes at least the following information: whether an object to which a sample belongs is a plane, and a medium type of a plane; and constructing a detection model based on an xgboost algorithm, and using the xgboost algorithm to generate a decision tree for detecting the medium type according to the sample sets, and training the detection model using the sample sets.

2. The robot of claim 1, wherein the processor groups the laser point data through the following processing:

grouping the laser point data according to a preset number of points, and taking each data of the preset number of points as a sample;

taking a first point in each sample as a coordinate origin, calculating local coordinate values of remaining points in the sample, and storing the local coordinate values in an array; and determining a farthest distance between points in the sample according to the array, and if the farthest distance exceeds a distance threshold, discarding the sample, otherwise selecting the sample to form a sample set.

3. The robot according to claim 2, wherein the processor further performs the following processing:

calculating a mean value and a variance of all abscissa values and ordinate values in the sample, taking the mean value and the variance as data features, and storing them in the array.

4. The robot of claim 1, wherein the processor trains the detection model using the sample sets through the following processing:

dividing the sample sets into a training set and a testing set, dividing the training set into multiple groups, training one group of training set, and then using the testing set to test;

if accuracy of a test result is lower than an accuracy threshold, analyzing a label and laser point data of each sample in the group of training set, and judging whether a data feature of the laser point data is consistent with the medium type in the label;

if it is consistent, keeping the sample, otherwise eliminating the sample until the group of training set satisfy an accuracy requirement;

adding one or more subsequent groups of training set and merging, then continuing training.

5. The robot according to claim 4, wherein the processor further performs the following processing:

if accuracy of a test result currently obtained is lower than the accuracy threshold, keeping a group of training set whose test result has an accuracy higher than the accuracy threshold, only analyzing data of one or more groups of training set added subsequently, and eliminating inconsistent samples in the groups of training sets added subsequently.

6. The robot according to claim 4, wherein the accuracy threshold is set to 90%.

7. The robot according to claim 4, wherein the processor further performs the following processing:

with respect to data of other conventional media wall, confirming whether the data is neatly and evenly distributed on a straight line;

with respect to data of a black medium wall, analyzing whether the data satisfies a corresponding sparseness requirement;

with respect to data of a mirror-like medium and a metal medium, analyzing whether their tortuosity and distribution conform to their predetermined laws.

* * * * *